Patented Apr. 29, 1930

1,756,528

UNITED STATES PATENT OFFICE

DEXTER J. TIGHT, OF SAN FRANCISCO, CALIFORNIA, ASSIGNOR TO R. N. NASON & CO., OF SAN FRANCISCO, CALIFORNIA, A CORPORATION OF CALIFORNIA

LACQUER

No Drawing.   Application filed June 3, 1924.   Serial No. 717,553.

This invention relates to a new and improved nitro-cellulose transparent lacquer for finishing furniture and the like, and to the methods of producing such a lacquer. The expression "transparent lacquer" herein is intended to mean a lacquer which, when applied to a surface in a coating or finishing operation, dries with a transparent finish.

Ordinarily in the manufacture of furniture, the finishing of the surfaces thereof is accomplished by the use of varnishes, stains, wood lacquer, etc. These materials are ordinarily applied by spraying, dipping or brushing, several coats being required for completely finishing a surface and each coat being allowed to dry before applying the next coat. The extensive use of nitro-cellulose lacquer for this purpose is of rather recent origin. However, as manufacturers are becoming better acquainted with lacquer and its various advantages, its use is becoming more common and popular.

Surfaces finished with lacquer have various advantages over those finished with varnish and other materials. Chiefly these advantages reside in the durability of such a finished surface and its ability to withstand abuse. Various tests have shown that lacquered surfaces will withstand abuses of various kinds without apparent injury, whereas varnished or otherwise finished surfaces will check or crack and show other possible deteriorations in a comparatively short time. These various tests include the severe application of live steam and hot and cold water, continuous heavy pressure of wet excelsior on such surfaces, application of heat and cold and exposure caused by direct rays of the sun by day and frosts at night, and continued exposure to all kinds of weather. None of these severe tests affected the lacquered surfaces in any injurious manner.

One of the primary reasons for the greater durability of the lacquered coat lies in the following facts. Varnish dries by a combination of evaporation and oxidation. During the first few minutes after the varnish is applied the volatile matter escapes into the air and the varnish takes on a "tack". From this point the drying of the varnish is a matter of the oils and gums being oxidized to a hard mass. This oxidation does not stop when the varnish has become fairly dry and hard. It continues until the saturation point is reached, when the varnish perishes, due to the fact that most of the oil that originally gave toughness to the film has been converted into a dry, hard, brittle mass. At this point pin holes or even checks and cracks appear in the varnish and allow moisture and other harmful agents to get under the surface, whereby the finish is entirely ruined.

Lacquer, on the other hand, dries by evaporation alone. All of the ingredients used in its manufacture are chemically stable and do not take on oxygen from the air. Within thirty minutes the film is dried to where it can be handled and within two or three days practically all of the volatile materials have evaporated, leaving a hard tough film that is not affected by moisture or climatic changes. A year or more after the lacquer has been applied, it will be found as tough and elastic as a few days after the work was finished. Finishing by lacquer is also a much cheaper operation, since the drying thereof takes place much quicker and does not require the use of specially constructed drying rooms and drying kilns as do other finishing materials, such as varnish.

The finishing of these surfaces in furniture manufacture is a very laborious operation, since after the last coat has been applied the surface must be thoroughly rubbed with pumice stone and oil or like material. This operation is required, since the known transparent lacquers now in use dry with a harsh gloss which is not at all pleasing to the eye. To give the dull pleasant effect which is most desirable, the surfaces must be rubbed as stated. It is one of the objects of my invention to provide an improved transparent lacquer which will dry with a dull finish, very similar to that now obtained by rubbing.

Certain of the surfaces of furniture, such as flat desk tops, etc. are very prominently exposed to observation, while other surfaces thereof are more obscure. Since the use of the present transparent lacquers leaves a glassy gloss which is very harsh to the eye and is greatly in contrast to such surface after the rubbing operation, these entire surfaces must be completely and carefully rubbed if the furniture is to be at all saleable and satisfactory.

Another object of my invention is the provision of a method of producing an improved transparent nitro-cellulose lacquer which will dry to a dull finish very similar to that obtained by rubbing, whereby the necessity of completely rubbing the said surfaces, and particularly the obscure surfaces, is eliminated.

With the above and other objects in view, my invention consists in the novel product herein defined and the various methods of producing such product. It should be understood, however, that while I have herein specifically defined certain methods for producing the said product, my invention contemplates variations in these methods within the scope of the appended claims.

Nitro-cellulose lacquer is a product made from dissolving nitro-cellulose in a combination of solvents and in many cases the nitro-cellulose is bodied up by the addition of a solution of various varnish gums. Whereas varnish, as ordinarily known is a product made from varnish gums compounded with drying oils such as linseed, China wood oil, etc., and thinned with a combination of turpentine and petroleum thinners.

As has been stated, transparent lacquers, either with or without the addition of varnish gums as at present used therein, dry with a glossy finish, as compared to a dull rubbed effect or nearly flat finish. The degree of gloss depends upon the body of the lacquer, whether a high or low viscosity nitro-cellulose is used and the amount and kind of varnish gums that are added.

Transparent lacquers have recently become rather generally used in the finishing of furniture, the process being to stain and fill the furniture in the usual way and then finish with one or two coats of lacquer, an intermediate coat of shellac or the like being often used before applying the lacquer. Since these transparent lacquers now known and used dry with a glossy finish, the lacquered surfaces must be thoroughly rubbed with pumice stone and oil or its equivalent, whereby to give a dull and pleasing finish to such surfaces.

My invention contemplates a transparent lacquer which drys with a dull substantially flat transparent rubbed-like finish, and thereby eliminates a large portion of this rubbing operation. The great economic value of the invention in practice can be understood when the extent of the furniture manufacturing industry is considered, and it is known that most of the rubbing referred to is a manual operation.

I am aware that lacquers have been made which dry with less gloss than other lacquers, this gloss being controlled within certain limits by the addition of certain kinds of varnish gums in various amounts as above stated. Certain of such lacquers are called "matte finish lacquers." These lacquers, however, being made of a high viscosity cotton, leave a thin film or coating on the work and the resulting gloss cannot be controlled sufficiently to in any manner leave the desired flat dull effect which my invention accomplishes. It should be understood, therefore, that these lacquers not only lack the necessary thickness of film for furniture work, but the resulting lustre of such lacquers is entirely too high to similate the rubbed effect above referred to. My invention is an improvement over such matte finishes which are made on an entirely different principle. As distinguished from such lacquer, my invention covers the manufacture of a lacquer that dries so dull that a large portion of the said rubbing in furniture manufacture is eliminated.

The best methods which I have so far devised for manufacturing my improved product will now be described.

One method of manufacturing my improved lacquer consists in taking the present known clear lacquer and grinding or adding thereinto transparent or semi-transparent pigments. Carbonate of magnesia, china clay and other such pigments may be effectively used for this purpose. A good formula that may be employed would be as follows: Mix together 4⅝ gallons clear viscosity nitro-cellulose lacquer and ⅜ gallons of paste. This paste is made by grinding sufficient carbonate of magnesia or such other transparent or semi-transparent pigments in a liquid or thinner soluble in the lacquer. To make a good grinding paste the proportion of pigment to liquid will depend upon the pigment used for instance, two pounds of carbonate of magnesia mixed with one gallon of liquid will make a good grinding paste; while 8 or 9 pounds of china clay or talc will be required to make a good grinding paste. It will be understood that the degree of flatness obtained depends upon the amount of paste employed. By adding more than ⅜ gallons of paste to 4⅝ gallons of nitro-cellulose lacquer, a flatter effect is obtained.

Conversely, by adding less than ⅜ gallons of paste a glossier finish is obtained.

This lacquer is of a low viscosity cotton and therefore of a consistency sufficient to leave thickness of film necessary for finishing furniture in the manner above referred to.

My improved lacquer may be originally manufactured of a consistency for spraying or of a consistency too heavy for spraying and may then be thinned to the necessary body for spraying, dipping or brushing with special solvents called thinners. Another method of carrying out my invention would be to grind the pigment or other ingredient in such a thinner which is soluble in the lacquer, and thereafter add this resulting compound to the clear lacquer. Furthermore, the pigment or other ingredient can be ground or prepared independently, then added to the thinner and the resulting composition thereafter added to the clear lacquer.

These are herein mentioned as only some of the various ways of carrying out my invention, and it should be understood that other methods within the scope of the appended claims are within the scope of my invention.

Having thus described my invention, what I claim and desire to secure by Letters Patent is:

1. An improved low viscosity nitro-cellulose lacquer including among its ingredients a pigment which is transparent or semi-transparent in the film so that the lacquer, when applied to a surface in a finishing or coating operation, will dry with a dull substantially flat transparent finish.

2. An improved low viscosity nitro-cellulose lacquer including among its ingredients pigment matter causing the lacquer, when applied to a surface in a finishing or coating operation, to dry with a dull substantially flat transparent finish, the lacquer having a consistency adapting it for spraying.

3. An improved low viscosity nitro-cellulose lacquer including among its ingredients ordinary clear nitro-cellulose lacquer and a pigment which is transparent or semi-transparent in the film so that the lacquer, when applied to a surface in a finishing or coating operation, will dry with a dull substantially flat transparent finish whereby the necessity for rubbing such surface to secure a dull finish is eliminated.

4. The method of manufacturing an improved nitro-cellulose lacquer consisting of treating a known lacquer by a process including the adding of a pigment which is transparent or semi-transparent in the film so that when the improved lacquer is applied to a surface in a finishing or coating operation, the same will dry with a dull substantially flat transparent finish.

5. The method of manufacturing an improved nitro-cellulose lacquer consisting of treating a known low-viscosity clear nitro-cellulose lacquer by a process including the adding of pigment matter thereto which is transparent or semi-transparent in the film so that when the improved lacquer is applied to a surface in a finishing or coating operation, the same will dry with a dull substantially flat transparent finish.

6. The method of manufacturing an improved nitro-cellulose lacquer consisting of adding ground pigment matter to a liquid soluble in nitro-cellulose lacquer and thereafter adding the resulting compound to a nitro-cellulose lacquer of known composition, the pigment matter used being such that when the improved lacquer is applied to a surface in a finishing or coating operation, the same will dry with a dull substantially flat transparent finish.

DEXTER J. TIGHT.